(12) United States Patent
Narita

(10) Patent No.: US 9,010,375 B2
(45) Date of Patent: Apr. 21, 2015

(54) ELECTROMAGNETIC VALVE EQUIPPED WITH MANUAL OPERATION ELEMENT INCLUDING SAFETY DEVICE

(71) Applicant: SMC Corporation, Chiyoda-ku (JP)

(72) Inventor: Masaru Narita, Kashiwa (JP)

(73) Assignee: SMC Corporation, Chiyoda-ku (JP)

( * ) Notice: Subject to any disclaimer, the term of this patent is extended or adjusted under 35 U.S.C. 154(b) by 315 days.

(21) Appl. No.: 13/739,126

(22) Filed: Jan. 11, 2013

(65) Prior Publication Data

US 2013/0193358 A1     Aug. 1, 2013

(30) Foreign Application Priority Data

Jan. 26, 2012   (JP) .................. 2012-014309

(51) Int. Cl.
| | |
|---|---|
| *F15B 13/044* | (2006.01) |
| *F16K 35/06* | (2006.01) |
| *F16K 31/05* | (2006.01) |
| *F16K 31/06* | (2006.01) |
| *F16K 35/02* | (2006.01) |
| *F16K 27/00* | (2006.01) |

(52) U.S. Cl.
CPC ........... *F16K 31/0675* (2013.01); *F16K 35/025* (2013.01); *F16K 27/003* (2013.01)

(58) Field of Classification Search
CPC .. F16K 27/003; F16K 31/0675; F16K 30/025
USPC ................... 137/384.2, 384.6, 384.8, 625.65, 137/625.66, 625.69; 251/90, 95, 111, 114, 251/115, 129.03, 237, 319, 320
See application file for complete search history.

(56) References Cited

U.S. PATENT DOCUMENTS 6,959,910 B2 * 11/2005  Matsumoto et al. ...... 251/129.03
7,328,720 B2 *  2/2008  Miyazoe ................. 137/596.16

FOREIGN PATENT DOCUMENTS

JP          11-22850         1/1999

* cited by examiner

*Primary Examiner* — Craig Schneider
*Assistant Examiner* — Kelsey Rohman
(74) *Attorney, Agent, or Firm* — Oblon, McClelland, Maier & Neustadt, L.L.P.

(57) ABSTRACT

On an outer surface of an electromagnetic valve body, a manual operation element is provided slidably horizontally, and a slide member is provided slidably in a direction orthogonal to a sliding direction of the manual operation element. The slide member is movable to a lock position and a non-lock position. At the lock position, the slide member is retained by the manual operation element to lock the manual operation element at a non-switch position. At the non-lock position, the slide member unlocks the manual operation element to allow the manual operation element to move toward a switch position.

13 Claims, 8 Drawing Sheets

ELECTROMAGNETIC VALVE EQUIPPED WITH MANUAL OPERATION ELEMENT INCLUDING SAFETY DEVICE

BACKGROUND OF THE INVENTION

1. Field of the Invention

The present invention relates to an electromagnetic valve including a manual operation element that is manually operated to switch a valve member, and a safety device that prevents erroneous operation of the manual operation element.

2. Description of the Related Art

While a typical electromagnetic valve is configured to switch a valve member for switching a flow passage of fluid by the action of electromagnetic force, it includes a manual operation mechanism that allows the valve member to be manually switched during a blackout, in an emergency, or during maintenance. There are push-in type and slide type manual operation mechanisms. In a push-in type, a switch shaft provided in an electromagnetic valve is pushed in by pressing an operating member provided on an outer surface of the electromagnetic valve, thereby switching a valve member. In contrast, in a slide type, a switch shaft is pushed in by an inclined face or the like provided on a lower face of an operating member, which is provided on an outer surface of an electromagnetic valve, by horizontally sliding the operating member along the outer surface, thereby switching the valve member, as disclosed in Patent Literature, Japanese Unexamined Patent Application Publication No. 11-22850. The slide type is easier to handle than the push-in type.

The electromagnetic valve is normally equipped with a safety device that prevents erroneous operation of the operating member. Patent Literature, Japanese Unexamined Patent Application Publication No. 11-22850, discloses a safety device that prevents erroneous operation of an operating member (operating piece) of the slide type. The safety device includes a cover covering the operating piece, and the cover is connected to an electromagnetic valve such as to be turnable about a shaft. When the operating piece is covered with the cover, it cannot be moved. The operating piece can be moved after the cover is opened.

BRIEF SUMMARY OF THE INVENTION

However, in the safety device disclosed in Patent Literature 1, one end of the cover is connected to the electromagnetic valve by the shaft, and the operating piece is covered and exposed to the outside by turning the cover about the shaft. Hence, a wide operation space is needed to turn the cover, and the operation of turning the cover is troublesome. Moreover, when the operating piece is located at an operating position, for example, the cover takes a semi-open or a semi-closed posture obliquely standing in contact with the operating piece. Therefore, the operating piece is visible or not visible according to the angle, and it is difficult to check the operating state of the operating piece.

An object of the present invention is to mount a cover for preventing erroneous operation of a slide type manual operation element included in an electromagnetic valve so that the cover can be operated even in a condition where a wide operation space is not provided, to enhance operability of the cover, and to easily check operating states of the cover and the manual operation element.

To achieve the above object, the present invention provides an electromagnetic valve in which an electromagnetic valve body including a main valve section incorporating a valve member configured to switch a flow passage of fluid, an electromagnetic operating section configured to switch the valve member by an electromagnetic force, and a manual operating section to be manually operated to switch the valve member is provided with a safety device configured to prevent erroneous operation of a manual operation element provided in the manual operating section.

The manual operation element is provided in the electromagnetic valve body to be horizontally slidable, and is movable to a non-switch position and a switch position. The safety device includes a base member fixed to the electromagnetic valve body, and a slide member held on the base member to be slidable in a direction orthogonal to a sliding direction of the manual operation element. The slide member is movable to a lock position and a non-lock position. The slide member is in contact with the manual operation element at the lock position to lock the manual operation element at the non-switch position, and the slide member is separate from the manual operation element at the non-lock position to allow the manual operation element to move toward the switch position.

In the present invention, preferably, the slide member includes a horizontal slide frame extending in the same direction as the sliding direction of the manual operation element, and a vertical slide frame continuing from the horizontal slide frame at a right angle. The horizontal slide frame has a lock face. The lock face is in contact with the manual operation element when the slide member is located at the lock position, and the lock face is separate from the manual operation element when the slide member is located at the non-lock position.

In this case, preferably, when the slide member is located at the non-lock position and the manual operation element is located at the switch position, the slide member is unable to move toward the lock position while a part of the manual operation element is placed under the horizontal slide frame, and, when the manual operation element is located at the non-switch position, the slide member is movable between the non-lock position and the lock position while the manual operation element is completely withdrawn from under the horizontal slide frame.

In the present invention, the base member includes a fitting groove in which the slide member is slidably fitted, and the fitting groove includes a horizontal groove portion in which the horizontal slide frame is fitted, and a vertical groove portion in which the vertical slide frame is fitted.

In the present invention, preferably, a positioning hole and a positioning projection to be fitted in the positioning hole are provided in one and the other of the base member and the slide member, respectively, and, when the slide member is moved from the lock position to the non-lock position, the positioning projection is caught in the positioning hole to position the slide member at the non-lock position.

Similarly, an elastic projection and an engaging portion that elastically engage with each other when the slide member is located at the lock position and the non-lock position can be provided in one and the other of the slide member and the base member, respectively.

Preferably, the positioning hole and the positioning projection, and the elastic projection and the engaging portion are provided in one and the other of a groove side wall of the vertical groove portion in the base member and a side face of the vertical slide frame in the slide member, respectively.

In the present invention, at least one of the slide member and the base member can have an identification mark that is visible from outside when the slide member is located at any one of the lock position and the non-lock position.

Preferably, the identification mark is formed by coloring a part of the slide member, is covered with the base member when the slide member is located at the lock position, and is exposed from the base member when the slide member is moved to the non-lock position.

According to the present invention, since the manual operation element can be locked at the non-switch position and unlocked to be moved to the switch position by sliding the slide member to the lock position and the non-lock position, the slide member does not need to be widely turned, unlike the related art. Therefore, a wide operation space where the slide member is turned is unnecessary, and the operation of the slide member is easier than the turning operation. Further, since the slide member is slid in the direction orthogonal to the sliding direction of the manual operation element, a positional relationship in the height direction of the slide member and the manual operation element relative to the outer surface of the electromagnetic valve is clearly different between the lock position and the non-lock position. Thus, the operating position of the slide member can be easily checked, and the operating position of the manual operation element can also be checked easily.

BRIEF DESCRIPATION OF THE DRAWINGS

DETAILED DESCRIPTION OF THE INVENTION

Figure 1:
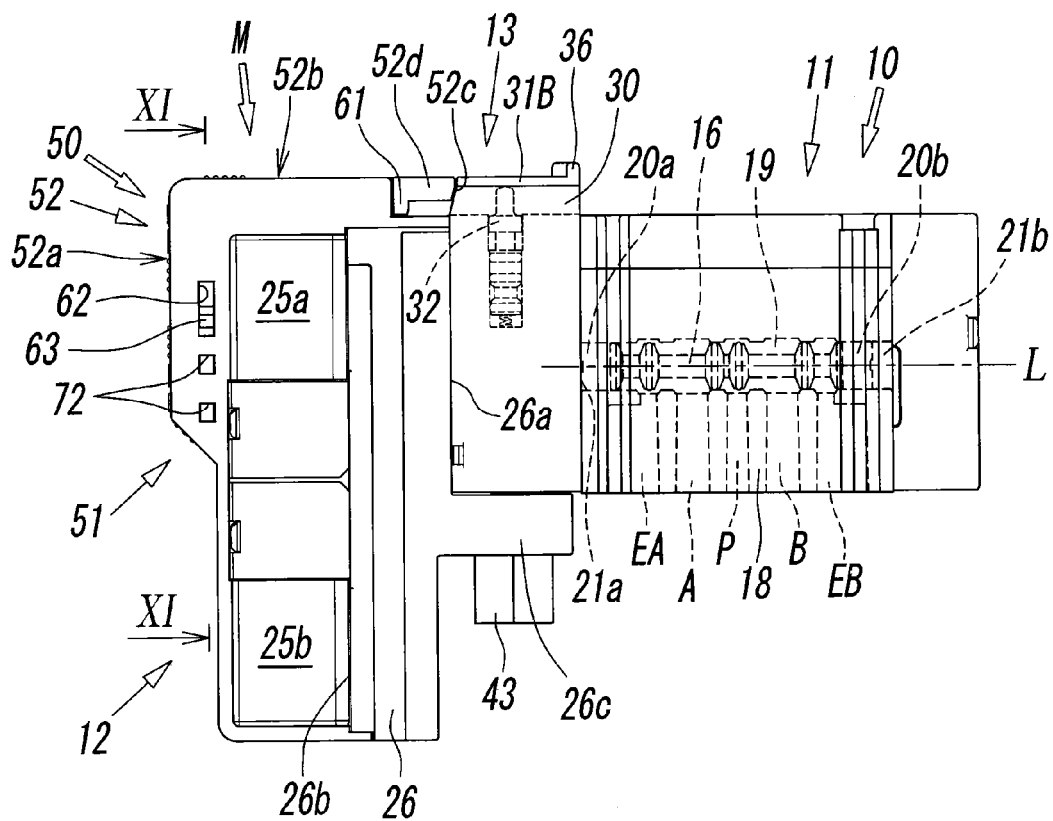
FIG. 1 is a side view of an electromagnetic valve according to the present invention, illustrating a state in which a slide member is located at a lock position to lock two manual operation elements at a non-switch position.
Figure 4:
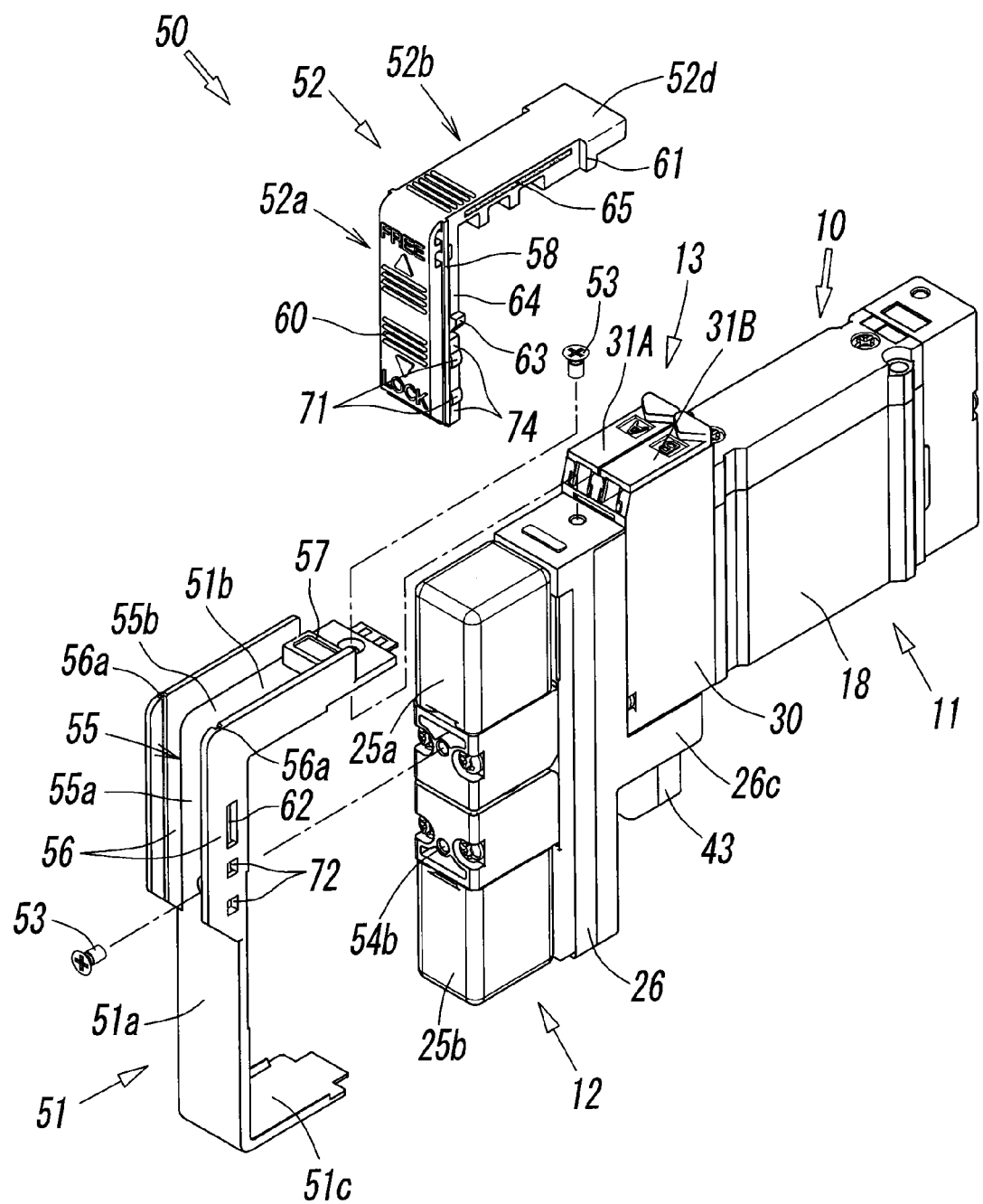
FIG. 4 is an exploded perspective view of the electromagnetic valve of FIG. 1, as viewed from an electromagnetic operating section side.
Figure 5:
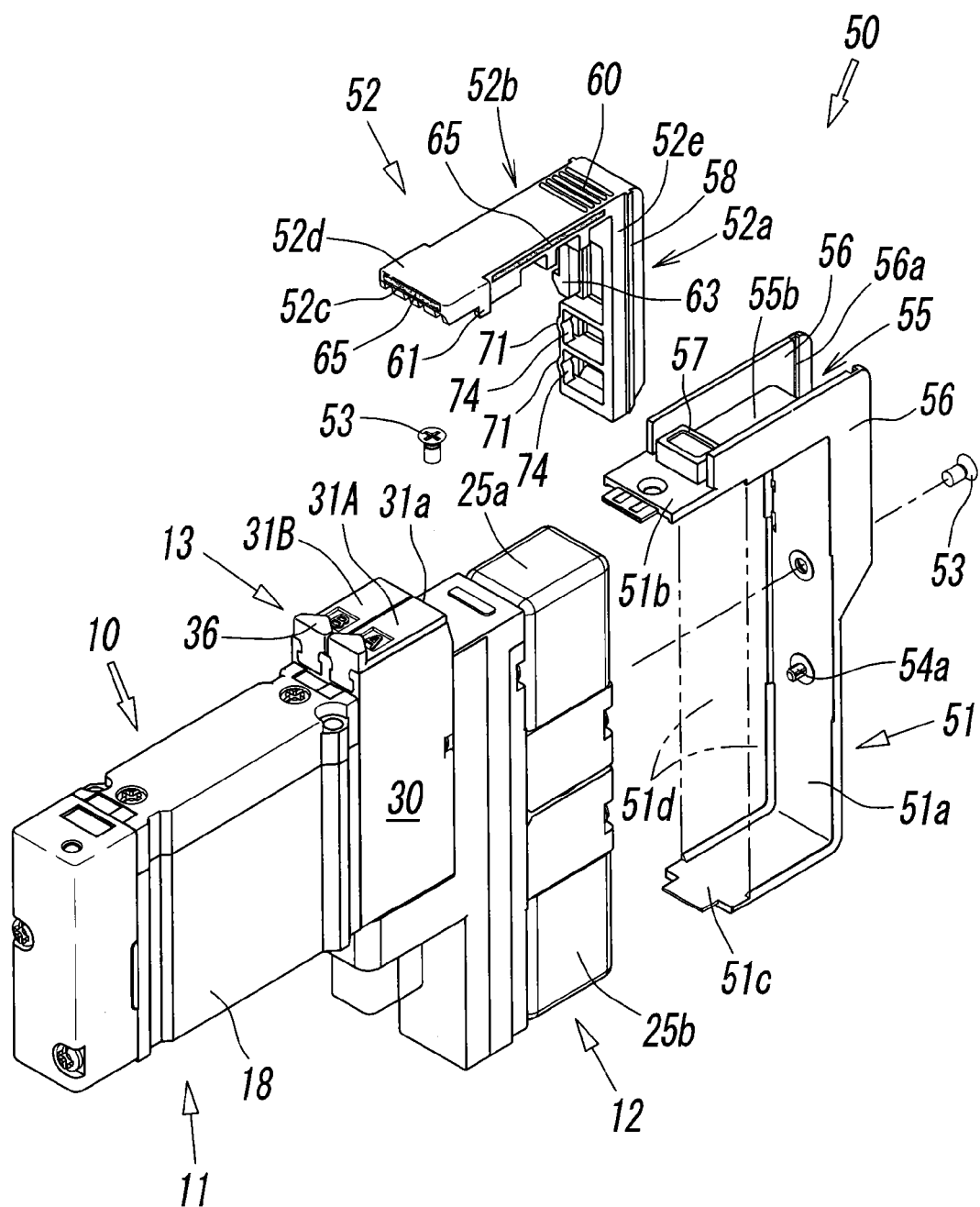
FIG. 5 is a perspective view of the electromagnetic valve of FIG. 4, as viewed from a main valve section side.

Drawings illustrate an embodiment of an electromagnetic valve equipped with a manual operation element including a safety device according to the present invention. As illustrated in FIGS. 1, 4, and 5, in the electromagnetic valve, an electromagnetic valve body 10 is provided with a safety device 50 that prevents erroneous operation of manual operation elements 31A and 31B.

The electromagnetic valve body 10 includes a main valve section 11 incorporating a valve member 16 for switching a flow passage in which main fluid, such as air, flows, an electromagnetic operating section 12 that switches the valve member 16 by the action of electromagnetic force, and a manual operating section 13 to be manually operated to switch the valve member 16. The manual operating section 13 includes the above-described manual operation elements 31A and 31B. The main valve section 11, the manual operating section 13, and the electromagnetic operating section 12 are connected in line in a direction of a center axis L of the valve member 16.

The main valve section 11 of the electromagnetic valve body 10 includes a main valve section housing 18 shaped like a rectangular block. The valve member 16 of a spool type is incorporated in a valve hole 19 provided in the main valve section housing 18 in a manner such as to be slidable in the direction of the center axis L. At opposite ends of the valve member 16, pilot pistons 20a and 20b are provided integrally with or separately from the valve member 16, and pressurizing chambers 21a and 21b are provided to apply the pilot fluid pressure to the pilot pistons 20a and 20b. By moving the valve member 16 in a right-left direction of FIG. 1 through the operation of the pilot pistons 20a and 20b, flow passages connecting a plurality of ports P, A, B, EA, and EB provided in the main valve section housing 18 are switched. However, since such a structure of the main valve section 11 is well known and does not directly relate to the scope of the invention, a further detailed description of the structure is skipped.

The electromagnetic operating section 12 includes two electromagnetically operated pilot valves 25a and 25b. By alternately turning on and off the pilot valves 25a and 25b, pilot fluid from the port P is alternately supplied to and discharged from the pressurizing chambers 21a and 21b so that the pilot pistons 20a and 20b are alternately operated to switch the valve member 16.

For example, when the upper first pilot valve 25a is turned on and the lower second pilot valve 25b is turned off, pilot fluid is supplied to the first pressurizing chamber 21a on a left side of the valve member 16, and the second pressurizing chamber 21b on a right side is opened to the outside. Hence, the valve member 16 is driven to the right in FIG. 1 by the first pilot piston 20a.

Conversely, when the upper first pilot valve 25a is turned off and the lower second pilot valve 25b is turned on, pilot fluid is supplied to the second pressurizing chamber 21b on the right side of the valve member 16, and the first pressurizing chamber 21a on the left side is opened to the outside. Hence, the valve member 16 is driven to the left by the second cam portion 20b, and is brought into a switch state of FIG. 1.

The two pilot valves 25a and 25b have the same structure, are formed as three-port electromagnetic valves, and are attached to an electromagnetic section housing 26.

The electromagnetic section housing 26 is shaped like a quadratic prism extending long vertically, and the vertical length thereof is more than the vertical length of the main valve section housing 18. An upper end of the electromagnetic section housing 26 is nearly aligned with an upper end of the main valve section housing 18, but a lower end thereof protrudes downward from a lower end of the main valve section housing 18.

The electromagnetic section housing 26 has an inner end surface 26a facing toward the main valve section 11, and an outer end surface 26b facing an opposite side. The two pilot valves 25a and 25b are attached to the outer end surface 26b while they are vertically aligned with their respective longitudinal ends butting against each other. A mount portion 26c horizontally extends from a middle portion of the inner end surface 26a toward the main valve section 11. A manual operating section housing 30 of the manual operating section 13 is mounted on the mount portion 26c, and the main valve section housing 18 is connected to the manual operating section housing 30.

A lateral width (thickness) of the electromagnetic section housing 26 is substantially equal to lateral widths of the manual operating section housing 30 and the main valve section housing 18, while a lateral width of the pilot valves 25a and 25b is slightly smaller than the lateral width of the electromagnetic section housing 26.

As illustrated in FIGS. 1 to 5, the manual operating section 13 includes the above-described two manual operation elements 31A and 31B, and two switch shafts 32 corresponding to the manual operation elements 31A and 31B. Upper ends of the switch shafts 32 are in contact with lower surfaces of the manual operation elements 31A and 31B. By pressing any of the switch shafts 32 through the corresponding manual operation element 31A or 31B, a communication state of the flow passages for pilot fluid is switched, whereby the pilot fluid is directly supplied to the pressurizing chamber 21a or 21b, and the valve member 16 is switched to the right or the left.

The structure and operation of the manual operating section 13 are substantially the same as those adopted in a well known electromagnetic valve except that the manual operation elements 31A and 31B are of a slide type. Hence, structures and operations relating to the manual operation elements 31A and 31B and the switch shafts 32 will be mainly described in detail below, and descriptions of other structures and operations are skipped.

Figure 9:
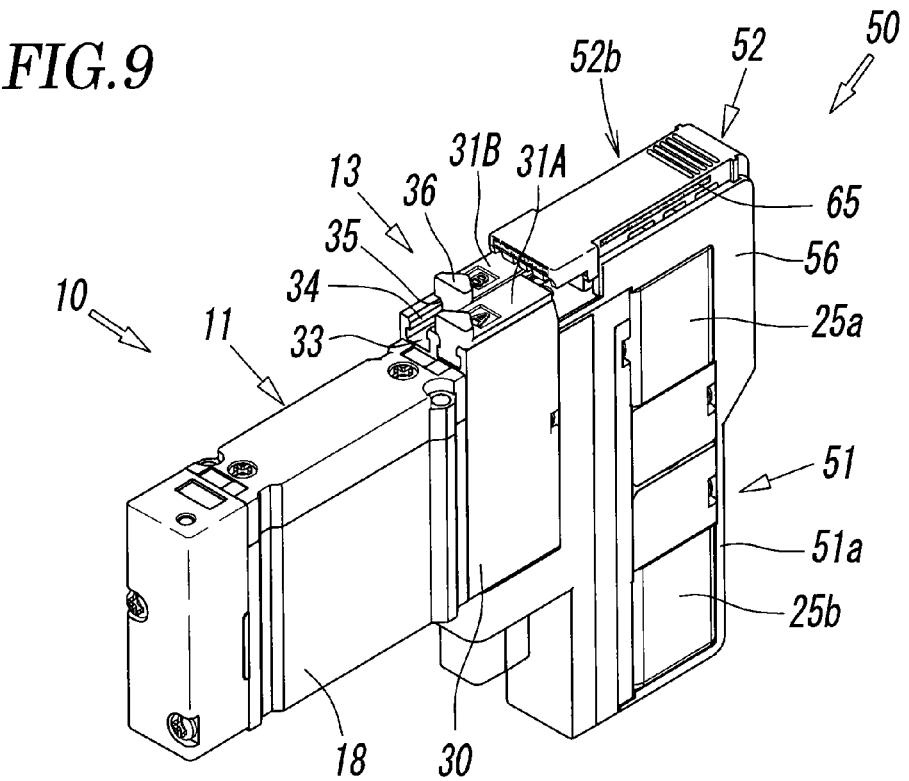
FIG. 9 is a perspective view of the electromagnetic valve of FIG. 6, as viewed from the main valve section side.
Figure 10:
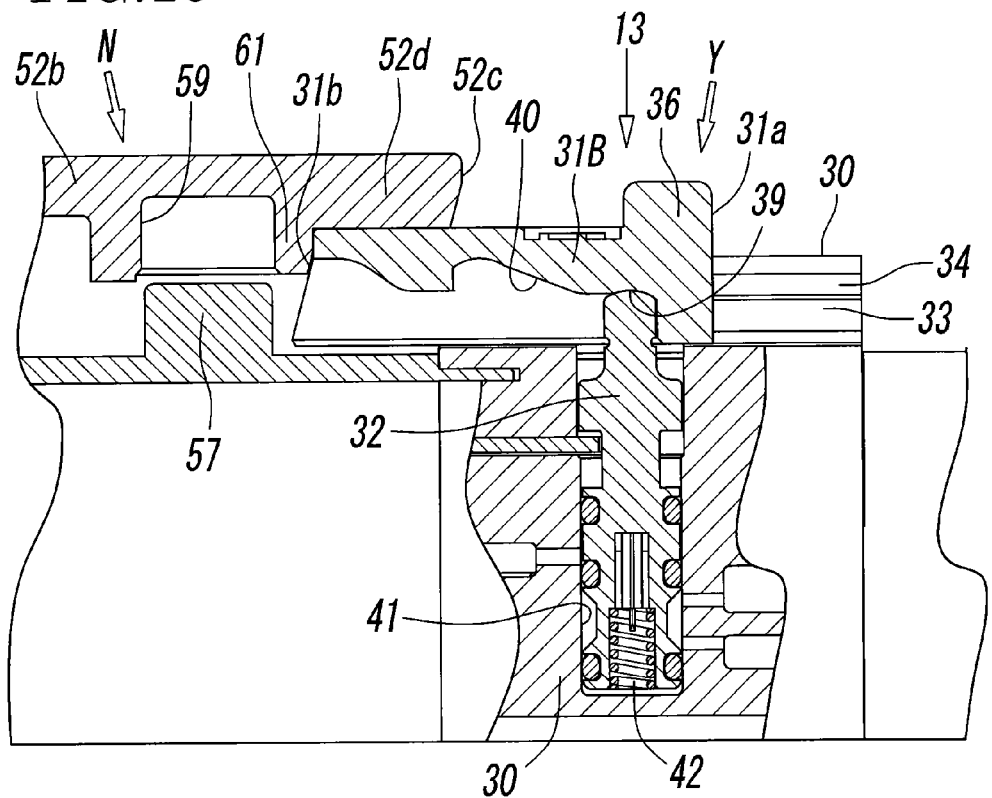
FIG. 10 is an enlarged sectional view, taken along line X-X of FIG. 7.

The two manual operation elements 31A and 31B are members shaped like a rectangle that extends long in the direction of the center axis L in plan view, and have the same structure. The manual operation elements 31A and 31B are arranged parallel to one side and the other side in a width direction of an outer surface, that is, an upper surface of the manual section housing 30, and are able to slide horizontally (in a direction parallel to the center axis L) along the upper surface. For this reason, as illustrated in FIGS. 9 and 10, the upper surface of the manual section housing 30 has two parallel operation grooves 33, and the manual operation elements 31A and 31B are slidably received in the operation grooves 33. Guide rails 34 facing inward at upper ends of groove walls of the operation grooves 33 are fitted in guide grooves 35 provided on side surfaces of the manual operation elements 31A and 31B. This structure allows the manual operation elements 31A and 31B to be slid without falling upward off the operation grooves 33.

Each of the manual operation elements 31A and 31B has a first end 31a close to the main valve section 11 and a second end 31b close to the electromagnetic operating section 12. From a position on an upper surface thereof near the first end 31a, a finger hook portion 36 projects upward for sliding operation.

Figure 3:
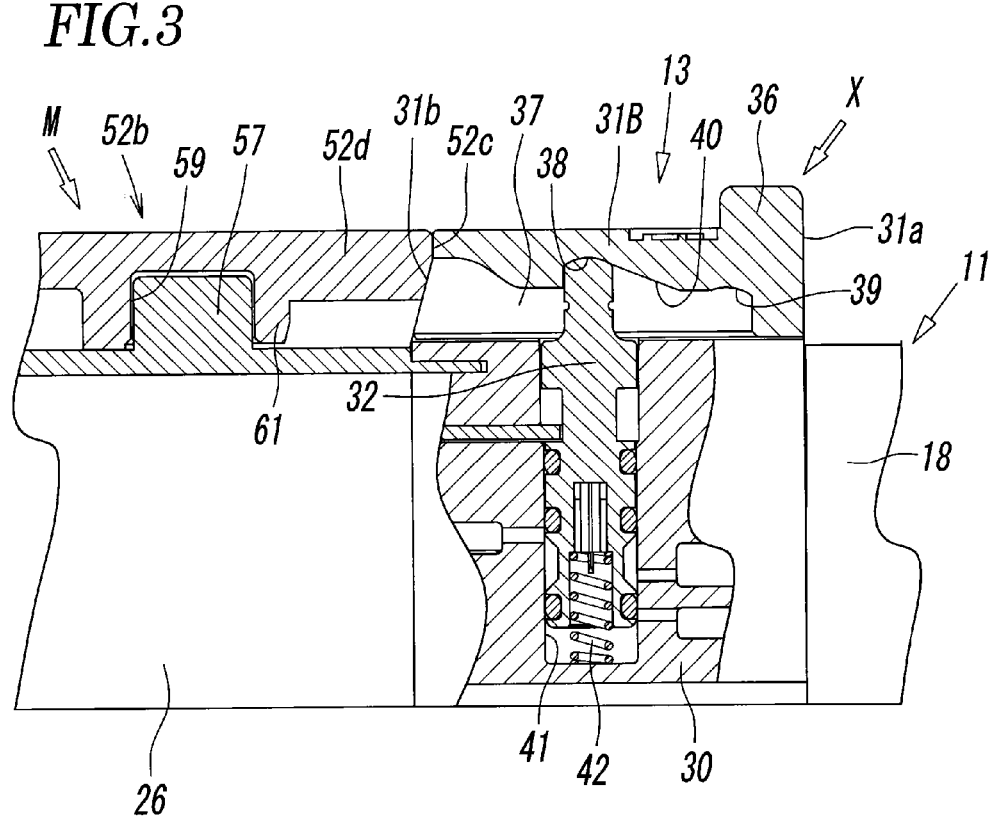
FIG. 3 is an enlarged sectional view, taken along line III-III of FIG. 2.

As illustrated in FIGS. 3 and 10, a lower surface of each of the manual operation elements 31A and 31B has a groove-shaped recess 37 extending to a middle portion between the second end 31b and the first end 31a. A ceiling wall of the recess 37 has a first operation face 38, a second operation face 39, and an inclined face 40 that allow the switch shaft 32 to move up and down.

The first operation face 38 is provided at a position closer to the second end 31b than the second operation face 39, and a distance from the first operation face 38 to the upper surface of the manual section housing 30 is longer than a distance from the second operation face 39 to the upper surface of the manual section housing 30. The inclined face 40 is provided between the first operation face 38 and the second operation face 39 such as to gradually slope in a direction to become closer to the upper surface of the manual section housing 30 as it extends from the first operation face 38 toward the second operation face 39.

Each of the manual operation elements 31A and 31B can be placed at a non-switch position X shifted toward the main valve section 11 (FIG. 3) and a switch position Y shifted toward the electromagnetic operating section 12 (FIG. 10) by sliding operation. As illustrated in FIG. 3, the non-switch position X is a position where the first operation face 38 opposes the upper end of the switch shaft 32, but does not push the switch shaft 32. When the manual operation element 31A or 31B is slid from the non-switch position X to the switch position Y, the switch shaft 32 is gradually pushed down by the inclined face 40. When the manual operation element 31A or 31B reaches the switch position Y, the upper end of the switch shaft 32 is brought into contact with the second operation face 39, as illustrated in FIG. 10, and the switch shaft 32 is completely pushed down, so that the pilot flow passage is switched and the valve member 16 is switched.

When the manual operation element 31A or 31B is returned from the switch position Y to the non-switch position X, the switch shaft 32 is raised and returned to the position of FIG. 3.

The switch shaft 32 is received slidably in the up-down direction in a shaft hole 41 that extends in the manual section housing 30 in a direction orthogonal to the center axis L, and an upper end thereof protrudes from the upper surface of the manual section housing 30. The switch shaft 32 is constantly biased upward by a return spring 42.

The first manual operation element 31A, of the two manual operation elements 31A and 31B, and the switch shaft (not illustrated) to be operated by the first manual operation element 31A correspond to the first pilot valve 25a. The second manual operation element 31B and the switch shaft 32 to be operated by the second manual operation element 31B correspond to the second pilot valve 25b. Therefore, when the manual operation element 31A is moved to the switch position Y, pilot fluid from the port P is supplied into the first pressurizing chamber 21a, and the valve member 16 is moved to the right in FIG. 1. When the second manual operation element 31B is moved to the switch position Y, as illustrated in FIG. 10, the pilot fluid is supplied into the second pressurizing chamber 21b, and the valve member 16 is moved to the left in FIG. 1.

Reference numeral 43 in FIG. 1 denotes a hollow power receiving connector protruding downward from the lower surface of the manual section housing 30, and pin-shaped terminals having continuity to the pilot valves 25a and 25b are incorporated in the power receiving connector 43. By connecting a power feeding connector of a control device to the power receiving connector 43, power is fed to the pilot valves 25a and 25b.

As illustrated in FIGS. 4 and 5 and other figures, the safety device 50 includes a base member 51 and a slide member 52. The base member 51 is fixed to the electromagnetic valve body 10, and the slide member 52 is held on the base member 51 such as to be slidable in a direction (up-down direction in the figures) orthogonal to a sliding direction of the manual operation elements 31A and 31B.

The base member 51 is formed of a rigid nonmagnetic material such as synthetic resin or an aluminum alloy, and is angularly U-shaped in side view. The base member 51 includes a vertical base frame 51a shaped like a narrow plate that vertically extends to cover the entire end faces of the two pilot valves 25a and 25b, an upper horizontal base frame 51b shaped like a narrow plate that horizontally extends from an upper end of the vertical base frame 51a to cover an upper side face of the upper pilot valve 25a, and a lower horizontal base frame 51c shaped like a narrow plate that horizontally extends from a lower end of the vertical base frame 51a to cover a lower side face of the lower pilot valve 25b. The base member 51 is fixed to the end face of the pilot valve 25a and the upper surface of the electromagnetic section housing 26 at the vertical base frame 51a and the upper horizontal base frame 51b by fixing screws 53.

Reference numeral 54a in the figures denotes a positioning pin provided on a back surface of the vertical base frame 51a. The positioning pin 54a is fitted in a positioning hole 54b to position the base member 51 when the base member 51 is fixed to the electromagnetic valve body 10.

On an outer surface of an upper half of the base member 51, an L-shaped fitting groove 55, in which the slide member 52 is fitted movably in the up-down direction, extends from an upper half of the vertical base frame 51a to the upper horizontal base frame 51b. The fitting groove 55 is provided between right and left groove side walls 56 projecting outward from both side ends in the width direction of the vertical base frame 51a and the upper horizontal base frame 51b, and is formed by a vertical groove portion 55a extending along the vertical base frame 51a, and a horizontal groove portion 55b extending along the upper horizontal base frame 51b.

On inner side faces of the right and left groove side walls 56 of the vertical groove portion 55a, guide grooves 56a, in which ribs 58 on side faces of the slide member 52 are slidably fitted, extend long in the up-down direction. A rectangular engaging projection 57 standing upward from the upper horizontal base frame 51b is provided at a distal end of the horizontal groove portion 55b. The engaging projection 57 has a cavity inside.

As shown by chain lines in FIG. 5, the base member 51 may include right and left side base frames 51d that cover the entire right and left side faces of the two upper and lower pilot valves 25a and 25b. When the base member includes the side base frames 51d, the shape of the base member is similar to the shape of a slip case that protects a book inserted therein.

The slide member 52 is L-shaped and is formed of a rigid nonmagnetic material such as synthetic resin or an aluminum alloy, and includes a vertical slide frame 52a extending in the up-down direction and a horizontal slide frame 52b continuing from an upper end of the vertical slide frame 52a at a right angle. The horizontal slide frame 52b extends in the same direction as the sliding direction of the manual operation elements 31A and 31B.

On right and left side faces of the vertical slide frame 52a, the above-described ribs 58 to be fitted in the guide grooves 56a of the base member 51 extend in the up-down direction. Upward and downward movements of the slide member 52 are guided by the guide grooves 56a and the ribs 58.

A lock face 52c at a distal end of the horizontal slide frame 52b faces toward the first ends 31a of the manual operation elements 31A and 31B, and a rectangular engaging hole 59 in which the engaging projection 57 of the base member 51 is to be fitted is provided in a position of the horizontal slide frame 52b near the lock face 52c. As illustrated in FIG. 3, when the slide member 52 is located at a down position (a lock position M), the engaging projection 57 is fitted and caught in the engaging hole 59, so that the slide member 52 is restricted from moving in a horizontal direction (direction along the center axis L).

Antislip members 60 are provided at a position of the horizontal slide frame 52b and a position of the vertical slide frame 52a on an outer surface of the slide member 52 to prevent the finger from slipping when sliding the slide member 52. The antislip members 60 are formed by a plurality of parallel ribs.

At a position on a lower surface of the horizontal slide frame 52b slightly shifted rearward from the lock face 52c, a stopper 61 extends in the width direction of the horizontal slide frame 52b. As illustrated in FIG. 10, when any of the manual operation elements 31A and 31B is moved to the switch position Y, the second end 31b of the manual operation element 31A or 31B is brought into contact with the stopper 61, so that the manual operation element 31A or 31B stops at the switch position Y. Alternatively, the manual operation element 31A or 31B may be stopped at the switch position Y by contact with the corresponding switch shaft 32.

The slide member 52 is movable to two positions, that is, a lock position M and a non-lock position N.

Figure 2:
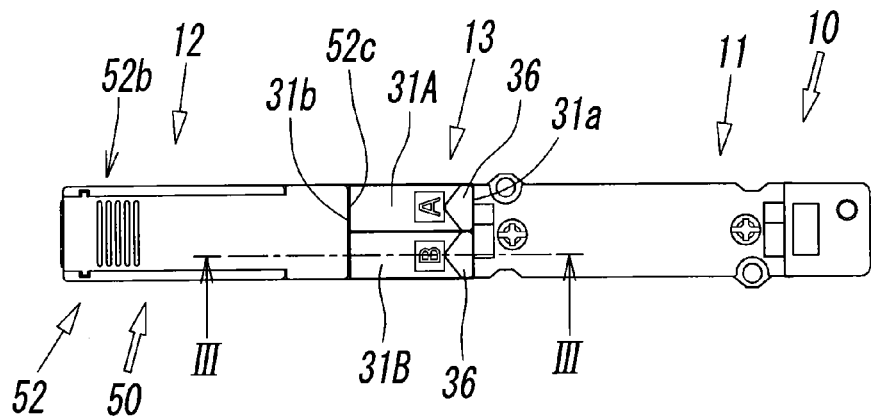
FIG. 2 is a plan view of the electromagnetic valve of FIG. 1.

As illustrated in FIGS. 1 to 3, the lock position M is an operating position taken when the slide member 52 is moved down to move the horizontal slide frame 52b closer to the upper surface of the electromagnetic valve body 10. At the lock position M, a lower face of the rib-shaped stopper 61 provided on the lower surface of the horizontal slide frame 52b is in contact with the upper surface of the upper horizontal base frame 51b of the base member 51, whereby the slide member 52 is stopped and positioned at the lock position M. At the lock position M, the lock face 52c of the horizontal slide frame 52b is located at the same height as that of the manual operation elements 31A and 31B from the upper surface of the electromagnetic valve body 10, and contacts with the second ends 31b of the manual operation elements 31A and 31B to lock the manual operation elements 31A and 31B at the non-switch position X. For this reason, none of the two manual operation elements 31A and 31B can be moved toward the switch position Y.

As illustrated in FIGS. 6 to 10, the non-lock position N is an operating position taken when the slide member 52 is moved up to move the horizontal slide frame 52b away from the upper surface of the electromagnetic valve body 10. At the non-lock position N, a distal end portion 52d of the horizontal slide frame 52b from the lock face 52c to the stopper 61 is located at a position higher than the manual operation elements 31A and 31B and is thereby out of contact with the manual operation elements 31A and 31B. Hence, the manual operation elements 31A and 31B are unlocked, and the two manual operation elements 31A and 31B are allowed to move toward the switch position Y. FIGS. 6 to 10 illustrate a state in which the second manual operation element 31B is slid to the switch position Y and the first manual operation element 31A is held at the non-switch position X without being slid.

When the manual operation element 31B is moved to the switch position Y, as illustrated in FIG. 10, a second end 31b side of the manual operation element 31B enters under the distal end portion 52d of the horizontal slide frame 52b, stops at a position in contact with the stopper 61, and overlaps with the horizontal slide frame 52b. At this time, a first end 31a side of the manual operation element 31B having the finger hook portion 36 remains exposed outside the horizontal slide frame 52b. Since the exposed first end 31a side is visible from any angle, it can be reliably determined that the manual operation element 31B is located at the switch position Y.

While a length of the portion of the manual operation element 31B entering under the horizontal slide frame 52b at the switch position Y is preferably about 40 to 50%, it may be other lengths as long as the portion is visible from outside.

When at least one of the two manual operation elements 31A and 31B is thus located at the switch position Y, the distal end portion 52d of the horizontal slide frame 52b of the slide member 52 at the non-lock position N is located on the manual operation element 31A or 31B at the switch position Y. Hence, if the slide member 52 is pushed down, it contacts with the upper surface of the manual operation element 31A or 31B, but cannot be pushed down to the lock position M. For this reason, erroneous operation of the slide member 52 can be prevented reliably.

The base member 51 and the slide member 52 are provided with a positioning mechanism for stopping and positioning the slide member 52 at the non-lock position N and an elastic retaining mechanism for retaining the slide member 52 at the lock position M and the non-lock position N.

The positioning mechanism is constituted by a positioning hole 62 provided in the base member 51 and a positioning projection 63 provided on the slide member 52. That is, as illustrated FIGS. 4, 5, 11, and 12, the positioning hole 62 extending in the up-down direction is provided in any one of the right and left groove side walls 56 of the vertical groove portion 55a in the base member 51, and the positioning projection 63 to be fitted in the positioning hole 62 is provided on one side face of the vertical slide frame 52a in the slide member 52.

To form the positioning projection 63, an arm 64 extending in the up-down direction is provided in a part of a side surface of a frame-shaped portion 52e provided on a back side of the vertical slide frame 52a. The arm 64 is connected at an upper end to the frame-shaped portion 52e, and is separate at side faces and a lower end from the frame-shaped portion 52e. The positioning projection 63 is provided at the lower end of the arm 64 having elasticity in a position such as to project sideward from the vertical slide frame 52a. An upper end face of the positioning projection 63 is horizontally flat, and a lower end face of the positioning projection 63 is an inclined face that gradually slopes in a direction to become closer to the upper end face as it extends toward a projection end of the positioning projection 63.

Figure 6:
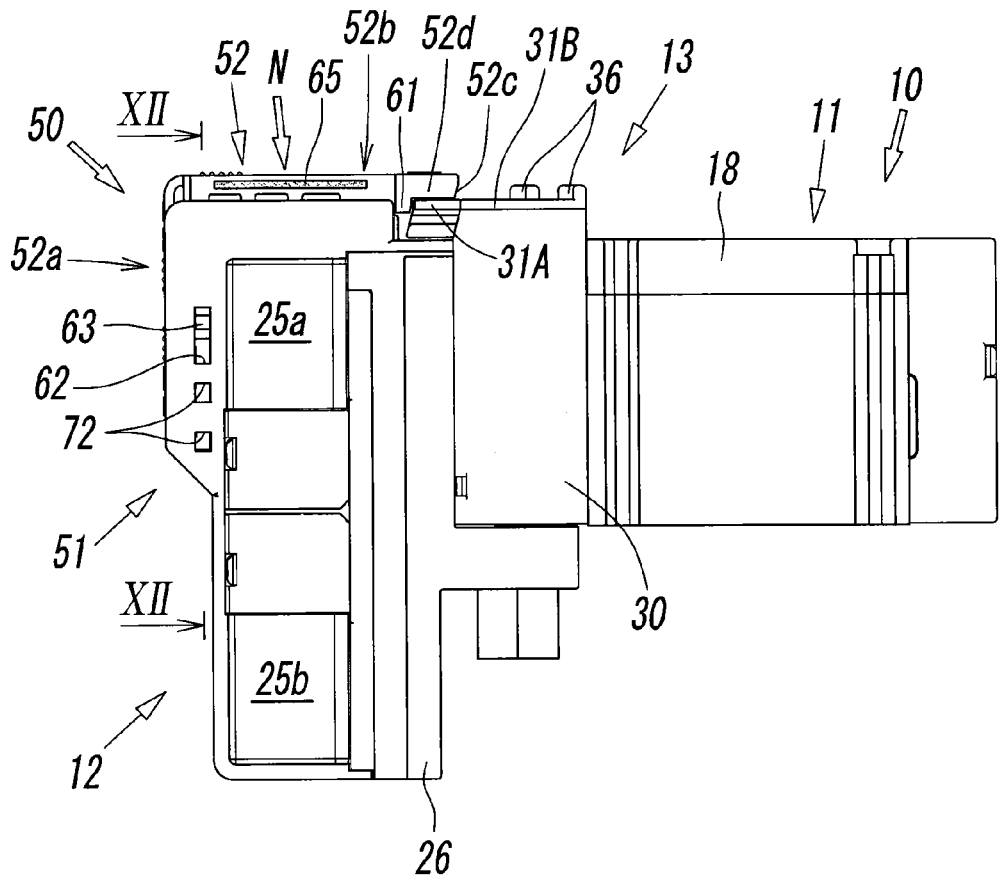
FIG. 6 is a side view of the electromagnetic valve of the present invention, illustrating a state in which the slide member is located at a non-lock position and one of the manual operation elements is moved to a switch position.
Figure 7:
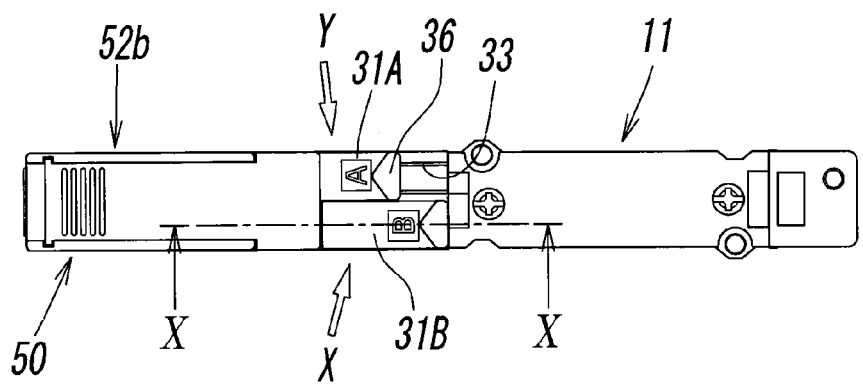
FIG. 7 is a plan view of the electromagnetic valve of FIG. 6.
Figure 8:
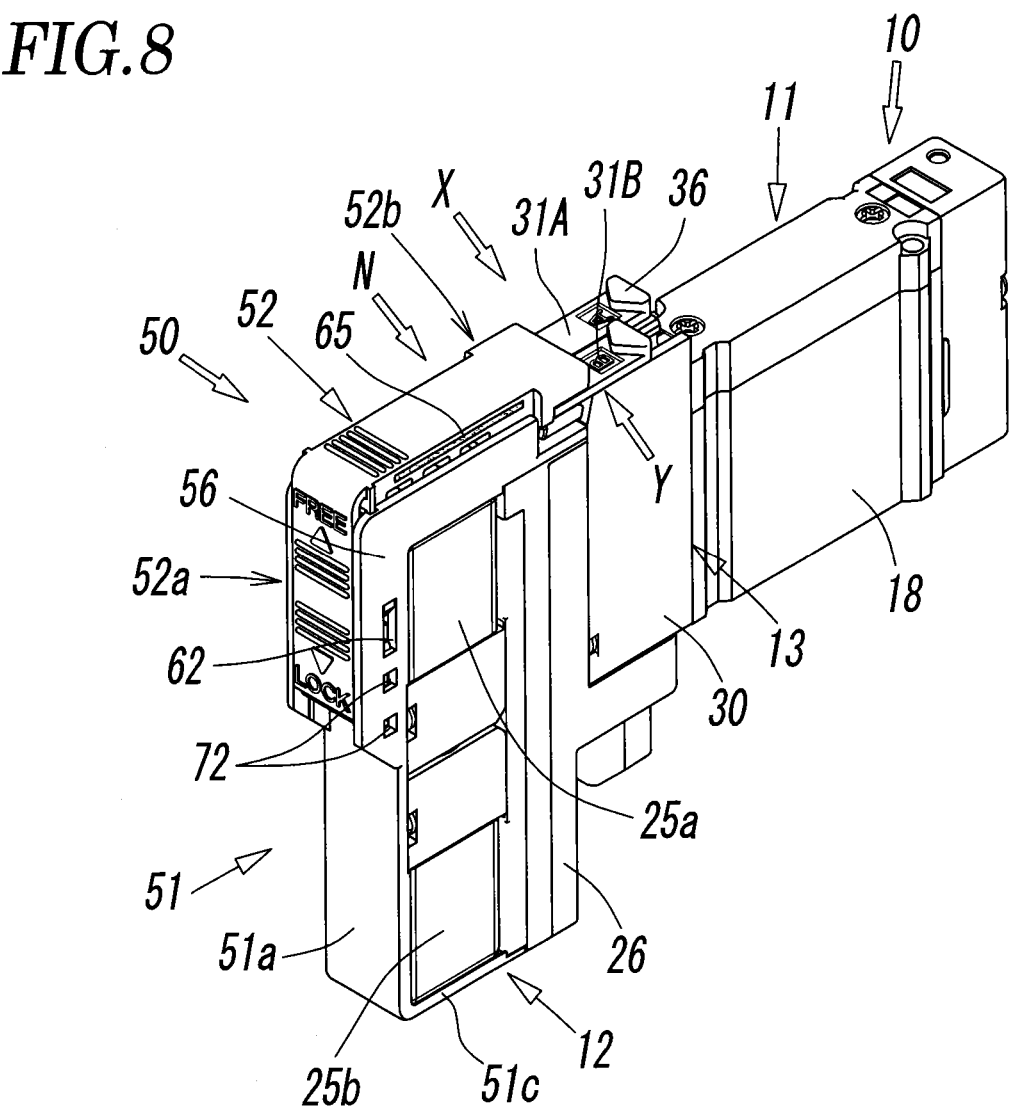
FIG. 8 is a perspective view of the electromagnetic valve of FIG. 6, as viewed from the electromagnetic operating section side.
Figure 11:
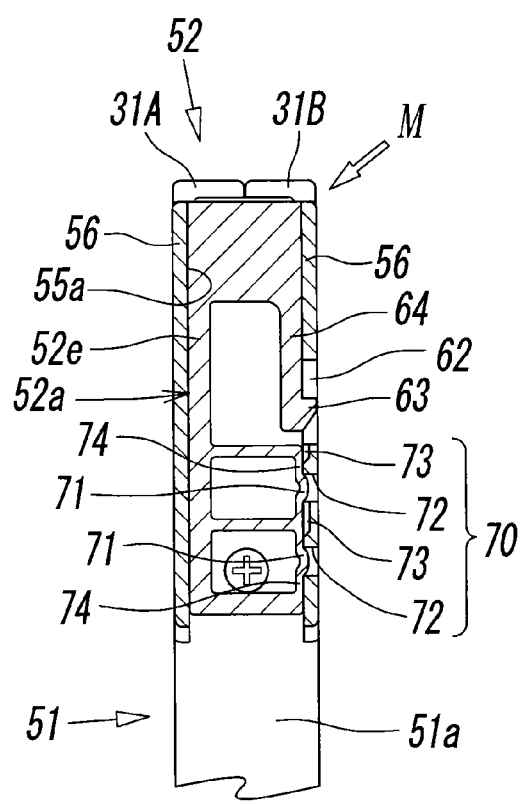
FIG. 11 is an enlarged sectional view, taken along line XI-XI of FIG. 1.
Figure 12:
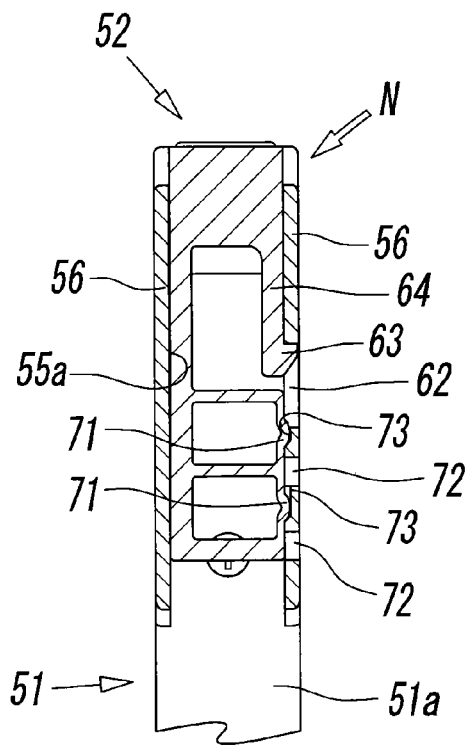
FIG. 12 is an enlarged sectional view, taken along line XII-XII of FIG. 6.

When the slide member 52 is at the lock position M, the positioning projection 63 is located at the center of the positioning hole 62, as illustrated in FIGS. 1 and 11. When the slide member 52 moves upward from the lock position M to the non-lock position N, the upper end face of the positioning projection 63 is brought into contact with and retained by an upper edge of the positioning hole 62, as illustrated in FIGS. 6 and 12, so that the slide member 52 is stopped at the non-lock position N and positioned at that position.

As illustrated in FIGS. 4, 5, 11, and 12, the elastic retaining mechanism is constituted by an engaging portion 70 provided in the groove side wall 56 of the vertical groove portion 55a in the base member 51, and elastic projections 71 provided on the side face of the vertical slide frame 52a in the slide member 52.

The engaging portion 70 includes two engaging holes 72 and two engaging recesses 73. The two engaging holes 72 and the two engaging recesses 73 are alternately arranged in the up-down direction in the groove side wall 56 having the positioning hole 62 and below the positioning hole 62. The engaging holes 72 penetrate through the groove side wall 56. The engaging recesses 73 are provided in an inner surface of a wall portion dividing the upper engaging hole 72 and the positioning hole 62 and an inner surface of a wall portion dividing the upper and lower engaging holes 72 in a manner such as not to penetrate through the groove side wall 56.

Two elastic projections 71 are provided in a part of the frame-shaped portion 52e on the back side of the vertical slide frame 52a in the slide member 52. That is, two elastic pieces 74 extending in the up-down direction are formed at a position below the position of the frame-shaped portion 52e where the positioning projection 63 is provided, by thinning a part of the frame-shaped portion 52e and separating a side face portion, excluding upper and lower ends, from the frame-shaped portion 52e. In the centers of the elastic pieces 74, the elastic projections 71 are curved to project sideward. The center distance between the two elastic projections 71 is equal to the center distance between the two engaging holes 72 and the center distance between the two engaging recesses 73.

With this structure, when the slide member 52 is located at the lock position M, the two elastic projections 71 are engaged with the two engaging holes 72 to hold the slide member 52 at the lock position M, as illustrated in FIG. 11.

When the slide member 52 is moved upward from the lock position M to the non-lock position N in FIG. 11, the two elastic projections 71 are elastically disengaged from the engaging holes 72 by elastic deformation of the elastic pieces 74, and move to the engaging recesses 73 beyond edges of the engaging recesses 73. When the slide member 52 is completely moved to the non-lock position N, the elastic projections 71 are fitted in the engaging recesses 73 to hold the slide member 52 at the non-lock position N, as illustrated in FIG. 12.

When the slide member 52 is moved downward from the non-lock position N of FIG. 12 to the lock position M of FIG. 11, the two elastic projections 71 are elastically disengaged from the engaging recesses 73 beyond the edges by elastic deformation of the elastic pieces 74. When the slide member 52 is completely moved to the lock position M, the elastic projections 71 are fitted in the engaging holes 72 to hold the slide member 52 at the lock position M, as illustrated in FIG. 11.

In this way, the slide member 52 is reliably held at the lock position M and the non-lock position N by the elastic retaining mechanism. When the slide member 52 is slid between the lock position M and the non-lock position N, the elastic projections 71 are elastically fitted in and disengaged from the engaging holes 72 and the engaging recesses 73, and the feeling of fitting and disengagement is transmitted to the hand. Hence, it is possible to reliably sense that the slide member 52 is moved to the lock position M and the non-lock position N.

Further, since the manual operation elements 31A and 31B can be locked and unlocked only by sliding the slide member 52 to the lock position M and the non-lock position N, erroneous operation of the manual operation elements 31A and 31B can be reliably prevented by a simple action. Moreover, since the slide member 52 does not need to be turned, unlike the cover in the safety device of the related art, a wide space for turning the slide member 52 is unnecessary.

When the slide member 52 is located at the lock position M, the upper surface of the horizontal slide frame 52b is substantially at the same height as the upper surfaces of the manual operation elements 31A and 31B, and there is no height difference between the slide member 52 and the manual operation elements 31A and 31B. When the slide member 52 is moved to the non-lock position N, the horizontal slide frame 52b is placed at a position higher than the manual operation elements 31A and 31B, and a height difference is formed between the slide member 52 and the manual operation elements 31A and 31B. In this way, the positional relationship of the slide member 52 and the manual operation elements 31A and 31B relative to the outer surface of the electromagnetic valve is clearly different between the lock position M and the non-lock position N. Hence, the operating position of the slide member 52 can be easily and reliably checked from outside. Further, since the manual operation elements 31A and 31B are not entirely covered with the slide member 52, regardless of where the slide member 52 and the manual operation elements 31A and 31B are located, the positions of the manual operation elements 31A and 31B can be checked easily.

To even more easily and clearly determine whether the slide member 52 is located at the lock position M or the non-lock position N, any one of the slide member 52 and the base member 51 can have identification marks 65 that are visible from outside only when the slide member 52 is moved to any one of the lock position M and the non-lock position N. In the illustrated embodiment, as illustrated in FIGS. 4 and 5, the identification marks 65 are formed by putting linear marks of a striking color different from the color of the slide member 52, such as orange or red, on right and left side faces of the horizontal slide frame 52b and on the lock face 52c at the distal end of the horizontal slide frame 52b. When the slide member 52 is moved down and located at the lock position M, as illustrated in FIG. 1, the identification marks 65 are not visible from outside because they are completely covered with the base member 51. In contrast, when the slide member 52 is moved up to the non-lock position N, as illustrated in FIG. 6, the identification marks 65 are exposed from the base member 51 and become visible from outside, so that it can be determined that the slide member 52 is located at the non-lock position N.

The identification marks 65 can be formed by a straight line, a curved line, a dot, a sign, or a pattern, or alternatively, can he formed by giving the above-described striking color to the entirety or a part of the right and left side faces of the horizontal slide frame 52b and/or the entirety or a part of the lock face 52c.

Instead of being formed on the slide member 52 or while being formed on the slide member 52, the identification marks 65 can be formed on the base member 51. When the identification marks 65 are formed on the base member 51, for example, they can be formed in portions of the vertical base frame 51a of the base member 51 that are covered with the slide member 52 and are exposed outside when the slide member 52 is moved up and down to the lock position M and the non-lock position N.

While the arm 64 and the positioning projection 63 are provided on the vertical slide frame 52a of the slide member 52 and the positioning holes 62 are provided in the groove side wall 56 of the vertical groove portion 55a of the base member 51 in the positioning mechanism of the embodiment, conversely, the arm 64 and the positioning projection 63 can be formed in the groove side wall 56 of the vertical groove portion 55a of the base member 51 and the positioning hole 62 can be formed in the vertical slide frame 52a of the slide member 52.

The arrangement of the elastic projections 71 and the engaging portion 70 in the elastic retaining mechanism in the embodiment may be reversed such that the elastic projections 71 are formed on the groove side wall 56 of the vertical groove portion 55a of the base member 51 and the engaging portion 70 is formed on the vertical slide frame 52a of the slide member 52.

Further, the elastic retaining mechanism can be constituted by one elastic projection 71, and two engaging holes 72 or two engaging recesses 73 such that the elastic projection 71 engages with one of the engaging holes 72 or engaging recesses 73 when the slide member 52 is located at the lock position M and such that the elastic projection 71 engages with the other engaging hole 72 or engaging recess 73 when the slide member 52 is located at the non-lock position N.

Conversely, the elastic retaining mechanism can be constituted by two elastic projections 71, and one engaging hole 72 or one engaging recess 73 such that one of the elastic projections 71 engages with the engaging hole 72 or the engaging recess 73 when the slide member 52 is located at the lock position M and such that the other elastic projection 71 engages with the engaging hole 72 or the engaging recess 73 when the slide member 52 is located at the non-lock position N.

Further, the elastic retaining mechanism may he provided not only one of the right and left sides of the base member 51 and the slide member 52, but also on both the right and left sides.

While the illustrated embodiment provides the double-pilot electromagnetic valve including the two pilot valves 25a and 25b and the two manual operation elements 31A and 31B, the present invention is also applicable to a single-pilot electromagnetic valve including one pilot valve and one manual operation element.

In the single-pilot electromagnetic valve, the vertical length of the electromagnetic section housing 26 of the electromagnetic valve body 10 and the vertical length of the base member 51 of the safety device 50 are normally set in accordance with the size of one pilot valve. The single-pilot electromagnetic valve can be formed by utilizing the electromagnetic section housing 26 of the electromagnetic valve body 10 and the base member 51 in the double-pilot type and removing any one of the pilot valves, that is, the pilot valve 25b and any one of the manual operation elements, that is, the manual operation element 31B while leaving the other pilot valve 25a and the other manual operation element 31A. In this case, a dummy member having a shape and a size similar to those of the removed pilot valve 25b can be attached instead of the pilot valve 25b, or a cover member covering the operation groove 33 in the upper surface of the manual section housing 30 can be mounted instead of the removed manual operation element 31B.

REFERENCE NUMERALS

10: electromagnetic valve body
11: main valve section
12: electromagnetic operating section
13: manual operating section
16: valve member
31A, 31B: manual operation element
50: safety device
51: base member
52: slide member
52a: vertical slide frame
52b: horizontal slide frame
52c: lock face
55: fitting groove
55a: vertical groove portion
55b: horizontal groove portion
56: groove side wall
62: positioning hole
63: positioning projection
65: identification mark
70: engaging portion
71: elastic projection
X: non-switch position
Y: switch position
M: lock position
N: non-lock position

The invention claimed is:

1. An electromagnetic valve equipped with a manual operation element including a safety device, in which an electromagnetic valve body including a main valve section incorporating in a valve member switching a flow passage of fluid, an electromagnetic operating section switching the valve member by an action of an electromagnetic force, and a manual operating section to be manually operated to switch the valve member is provided with a safety device for preventing erroneous operation of a manual operation element provided in the manual operating section,
wherein the manual operation element is provided in the electromagnetic valve body so as to be horizontally slidable, and is movable to a non-switch position and a switch position, and
wherein the safety device includes a base member fixed to the electromagnetic valve body, and a slide member held on the base member so as to be slidable in a direction orthogonal to a sliding direction of the manual operation element, the slide member is movable to a lock position and a non-lock position, and the slide member is in contact with the manual operation element at the lock position, thereby locking the manual operation element at the non-switch position, and the slide member is separate from the manual operation element at the non-lock position to allow the manual operation element to move toward the switch position.

2. The electromagnetic valve according to claim 1,
wherein the slide member includes a horizontal slide frame extending in the same direction as the sliding direction of the manual operation element, and a vertical slide frame stretching from the horizontal slide frame at a right angle, the horizontal slide frame has a lock face, the lock face is in contact with the manual operation element when the slide member is located at the lock position, and the lock face is separate from the manual operation element when the slide member is located at the non-lock position.

3. The electromagnetic valve according to claim 2,
wherein, when the slide member is located at the non-lock position and the manual operation element is located at the switch position, the slide member is unable to move toward the lock position since a part of the manual operation element is placed under the horizontal slide frame, and, when the manual operation element is located at the non-switch position, the slide member is movable between the non-lock position and the lock position since the manual operation element is completely withdrawn from under the horizontal slide frame.

4. The electromagnetic valve according to claim 2,
wherein the base member includes a fitting groove in which the slide member is slidably fitted, and the fitting groove includes a horizontal groove portion in which the horizontal slide frame is fitted, and a vertical groove portion in which the vertical slide frame is fitted.

5. The electromagnetic valve according to claim 4,
wherein a positioning hole and a positioning projection fitting in the positioning hole are respectively provided in one and the other of the base member and the slide member, and, when the slide member is moved from the lock position to the non-lock position, the positioning projection is caught in the positioning hole to position the slide member at the non-lock position.

6. The electromagnetic valve according to claim 5,
wherein the positioning hole and the positioning projection are provided in one and the other of a groove side wall of the vertical groove portion in the base member and a side face of the vertical slide frame in the slide member, respectively.

7. The electromagnetic valve according to claim 4,
wherein, when the slide member is located at the lock position and the non-lock position, an elastic projection and an engaging portion that elastically engage with each other are provided in one and the other of the slide member and the base member, respectively.

8. The electromagnetic valve according to claim 7,
wherein the elastic projection and the engaging portion are provided in one and the other of a groove side wall of the vertical groove portion in the base member and a side face of the vertical slide frame in the slide member.

9. The electromagnetic valve according to claim 5,
wherein, when the slide member is located at the lock position and the non-lock position, an elastic projection and an engaging portion that elastically engage with each other are provided in one and the other of the slide member and the base member, respectively.

10. The electromagnetic valve according to Claim. 9,
wherein the elastic projection and the engaging portion are provided in one and the other of a groove side wall of the vertical groove portion in the base member and a side face of the vertical slide frame in the slide member.

11. The electromagnetic valve according to claim 1,
wherein at least one of the slide member and the base member has an identification mark that is visible from outside when the slide member is located at any one of the lock position and the non-lock position.

12. The electromagnetic valve according to claim 11,
wherein the identification mark is formed by coloring a part of the slide member, is covered with the base member when the slide member is located at the lock position, and is exposed from the base member when the slide member is moved to the non-lock position.

13. The electromagnetic valve according to claim 4,
wherein guide grooves and ribs that mutually fit for guiding a sliding of the slide member are provided in one and the other of the groove side wall of the vertical groove portion in the base member and a side face of the vertical slide frame in the slide member.

* * * * *